United States Patent [19]

Tschudi et al.

[11] 3,928,809

[45] Dec. 23, 1975

[54] PULSE WIDTH CONTROL SYSTEM

[75] Inventors: Dennis E. Tschudi, Granada Hills; Richard H. Geordan, Covina, both of Calif.

[73] Assignee: Whittaker Corporation, Los Angeles, Calif.

[22] Filed: May 6, 1974

[21] Appl. No.: 467,199

[52] U.S. Cl. .................. 328/58; 307/265; 307/314; 328/67

[51] Int. Cl.² .......................................... H03K 5/04

[58] Field of Search ......... 328/58, 67; 307/265, 314

[56] References Cited

UNITED STATES PATENTS

| | | | |
|---|---|---|---|
| 3,435,249 | 3/1969 | Farrell | 307/265 X |
| 3,486,100 | 12/1969 | James | 328/58 X |
| 3,569,810 | 3/1971 | Thiele | 307/265 X |

*Primary Examiner*—Siegfried H. Grimm
*Attorney, Agent, or Firm*—Henry M. Bissell

[57] ABSTRACT

A magnetic modulator for pulsed magnetrons is provided in which the width of the modulating pulse is continuously variable over a predetermined range and is automatically controlled at a predetermined width by reason of a novel feedback loop utilizing rectified RF output pulses to change the operating point on the B-H characteristic loop of a saturable core reactor and hence to change the time required to switch the reactor into a saturated condition in which the voltage applied to the magnetron falls below the magnetron's requirement for oscillation. The residual energy not consumed by the magnetron is dissipated in a heat sink or stored for the powering of subsequent pulses applied to the magnetron.

22 Claims, 6 Drawing Figures

PULSE WIDTH CONTROL SYSTEM

BACKGROUND OF THE INVENTION

1. Field of the Invention

This invention relates to pulse modulators for magnetrons and more specifically to magnetron pulse modulators which are capable of producing pulses of variable width.

2. Description of the Prior Art

Previous pulsing systems for magnetrons have been capable of producing pulses of different widths only upon the switching into the modulation circuit of discrete pulse-forming networks with fixed delay times. The number of such pulse-forming networks used is usually two. Such systems are incapable of producing pulses of any desired width within a range, a capability which is desirable in certain radar applications, for example in systems where the length of the RF pulse transmitted by the antenna coupled to the magnetron must fit predetermined characteristics which may be changed from time to time. Previous magnetron pulsing circuits have usually incorporated hard tube or gas tube modulators while the modulator according to the present invention uses solid state devices only, to achieve maximum compactness and reliability.

Furthermore, prior art pulse systems have been subject to drifting of the width of the output pulse from the magnetron without correction of that pulse width to a predetermined value.

SUMMARY OF THE INVENTION

It is a general object of the present invention to provide a pulse width modulator which overcomes the various problems and disadvantages which have been discussed hereinbefore.

It is a further object of this invention to provide means for varying, on a continuous basis over a range of width values, the width of the pulse provided by a modulator to a magnetron.

It is a still further object of the present invention to provide, in a pulse modulator for a magnetron or other signal generator, means for correcting any deviation of the pulse width from a predetermined value.

It is an additional object of the present invention to provide for a pulsed magnetron a magnetic modulator capable of supplying pulses of continuously variable width within a predetermined range of widths, such modulator being capable of automatically maintaining the predetermined pulse width despite drifting of other parameters in the modulation circuit.

Stated succinctly, the magnetron modulator according to the present invention utilizes a saturable core switching reactor to divert power from the magnetron to a power sink when the width of the pulse emitted by the magnetron exceeds the width which has been predetermined as desirable by the adjustment of a pulse width control. The pulse width control essentially fixes the reset point on the B-H loop characteristic of the saturable core in the switching reactor. The pulse width control also may include circuitry for deriving a rectified RF output pulse from the magnetron and transforming the width of that detected RF pulse into a voltage, storing that voltage and converting it to a current proportional to the pulse width of the detected RF pulse. That current changes the operating point on the B-H curve so that the timing of the switching by the switching reactor is varied to correct in the succeeding pulse applied to the signal generator any errors in the width of the RF pulse which has been rectified. The pulse width control circuits in conjunction with the switching reactor, the magnetron and the RF detector comprises a negative feedback loop. As such, if the pulse width exceeds a desired width, the output of the pulse width control circuits causes the switching reactor to turn on sooner for the next pulse that is generated, thus reducing the pulse width to the predetermined value. This automatic correction is desirable since all of the switching reactors and transformers are volt-second, as well as temperature, dependent. Pulse width control may be achieved automatically not only with respect to a pulse width adjustment made to a control stage designed for that purpose but also by means of reference to an input reference pulse or a digital reference, the latter being either a manually switched control function or one which is based on information received from an associated digital source such as a computer.

Some other features are provided in the circuits disclosed herein, for example noise rejection circuits which prevent spurious operation of the pulsing circuits, and other circuits which accommodate magnetron mismode firing and other random phenomena.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENT

Figure 1:
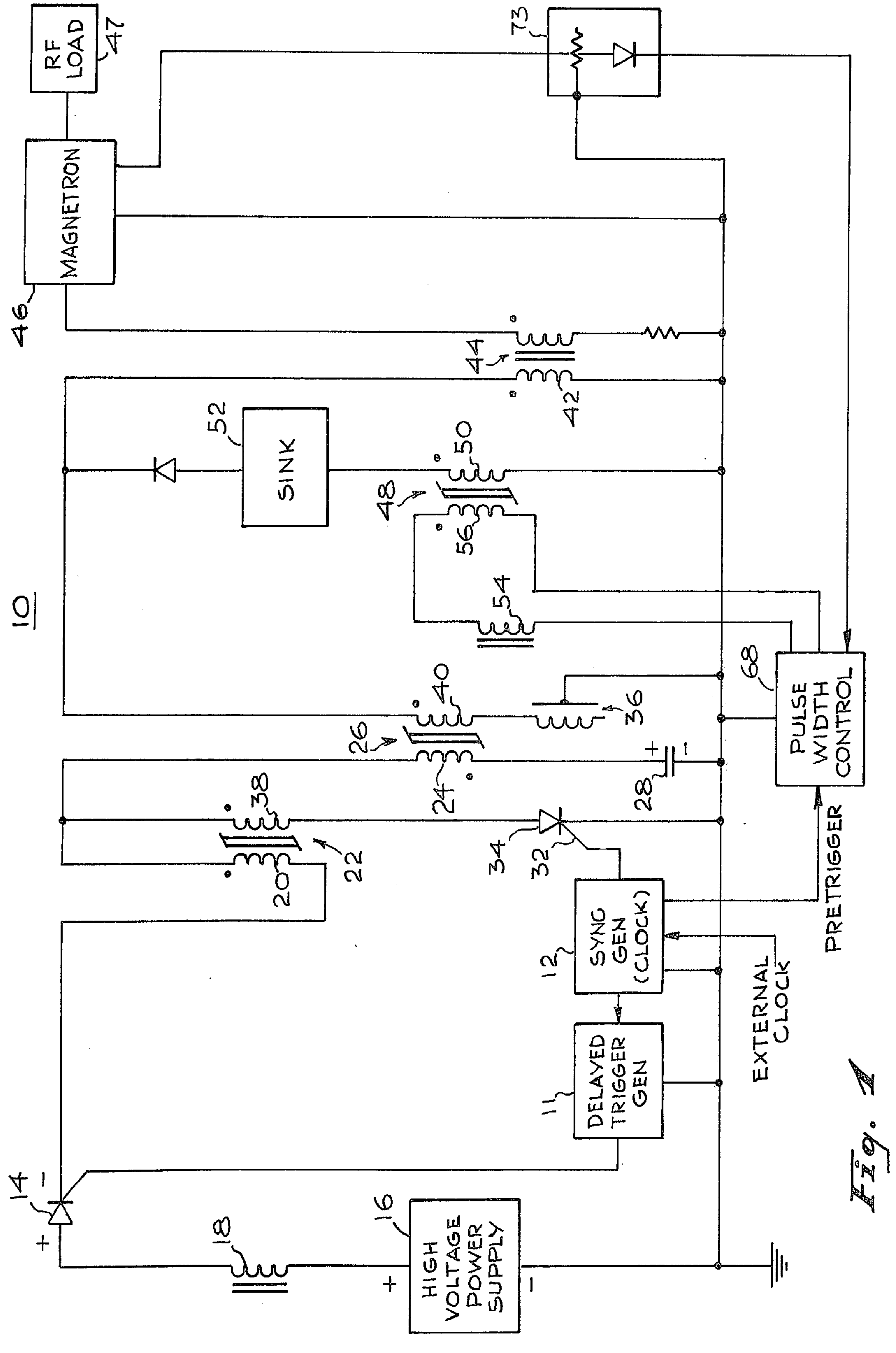
FIG. 1 is a combination block and schematic diagram of a pulse width control system according to the present invention.

In FIG. 1, a system 10 is shown including a delayed trigger generator 11, coupled to respond to a control pulse from a sync generator 12 and generate a pulse to turn on an associated SCR 14 coupled in series between a high voltage power supply 16 and the remainder of the system 10 comprising the modulator and magnetron stages. When turned on, SCR 14 permit passage of current from power supply 16 through inductance 18, winding 20 of saturable core reactor 22, and first winding 24 of saturable core transformer 26 to a storage capacitor 28. The capacitor 28 is resonantly charged, according to well-known principles, to approximately twice the voltage appearing at the terminals of high voltage power supply 16. This charge on capacitor 28 cannot return through power supply 16 because the reversal of polarity turns off the SCR 14.

A signal from sync generator 12 is then applied to control element 32 of SCR 34 and the energy in capacitor 28 is transferred to pulse-forming network 36 by reason of the discharge of capacitor 28 through winding 24 of transformer 26 and winding 38 of saturable core reactor 22. The function of saturable core reactor 22 is to allow the voltage at the anode of SCR 34 to fall to ground potential before the capacitor 28 is allowed to begin discharging. The charging of pulse forming network 36 is terminated when the volt-seconds applied to the first winding 24 of saturable core transformer 26 cause transformer 26 to be driven into saturation. At that point, the inductance of secondary winding 40 of transformer 26 falls substantially to zero and permits the pulse-forming network 36 to discharge freely through primary 42 of transformer 44 at a rate which is proportional to the charge voltage of the pulse-forming network 36 and its characteristics impedance. In order to have maximum power transfer to magnetron 46 it is essential that the impedance offered by magnetron 46, as reflected back to pulse-forming network 36, be substantially equal to the characteristic impedance of network 36. It should be noted that the width of the pulse developed by the magnetic modulator circuit just described is fixed and approximates twice the single-path delay time of pulse-forming network 36.

As has been indicated, it is one object of this invention to achieve a variable pulse width and to maintain the pulse width which is chosen for operation. That end is achieved in the present circuit as follows. Termination of the RF pulse from magnetron 46 occurs when the volt-seconds developed across switching reactor 48, which has a saturable core, are sufficient to drive that core into saturation. When saturation occurs the impedance of winding 50 falls to a very low value, thereby connecting energy sink 52 in parallel with primary 42 of transformer 44. The voltage across primary 42 drops by about one-third of its previous value with the result that the voltage applied to magnetron 46 is insufficient to maintain oscillation of the magnetron. As a consequence, magnetron 46 ceases to be a load for the pulse forming network 36 and any energy remaining in the pulse forming network is dissipated in energy sink 52. In one embodiment energy sink 52 is a resistor and the energy is dissipated as thermal energy. However, it is within the scope of this invention to re-cycle this energy, as by storing it and then transferring it back to either the primary energy source (the high voltage power supply 16) or the storage capacitor 28, the only condition being that the impedance presented by the energy sink 52 be equal to that of the characteristic impedance of the pulse-forming network 36. By these latter techniques an increase in the overall efficiency of the modulator may be achieved.

Figures 2, 5, 6:
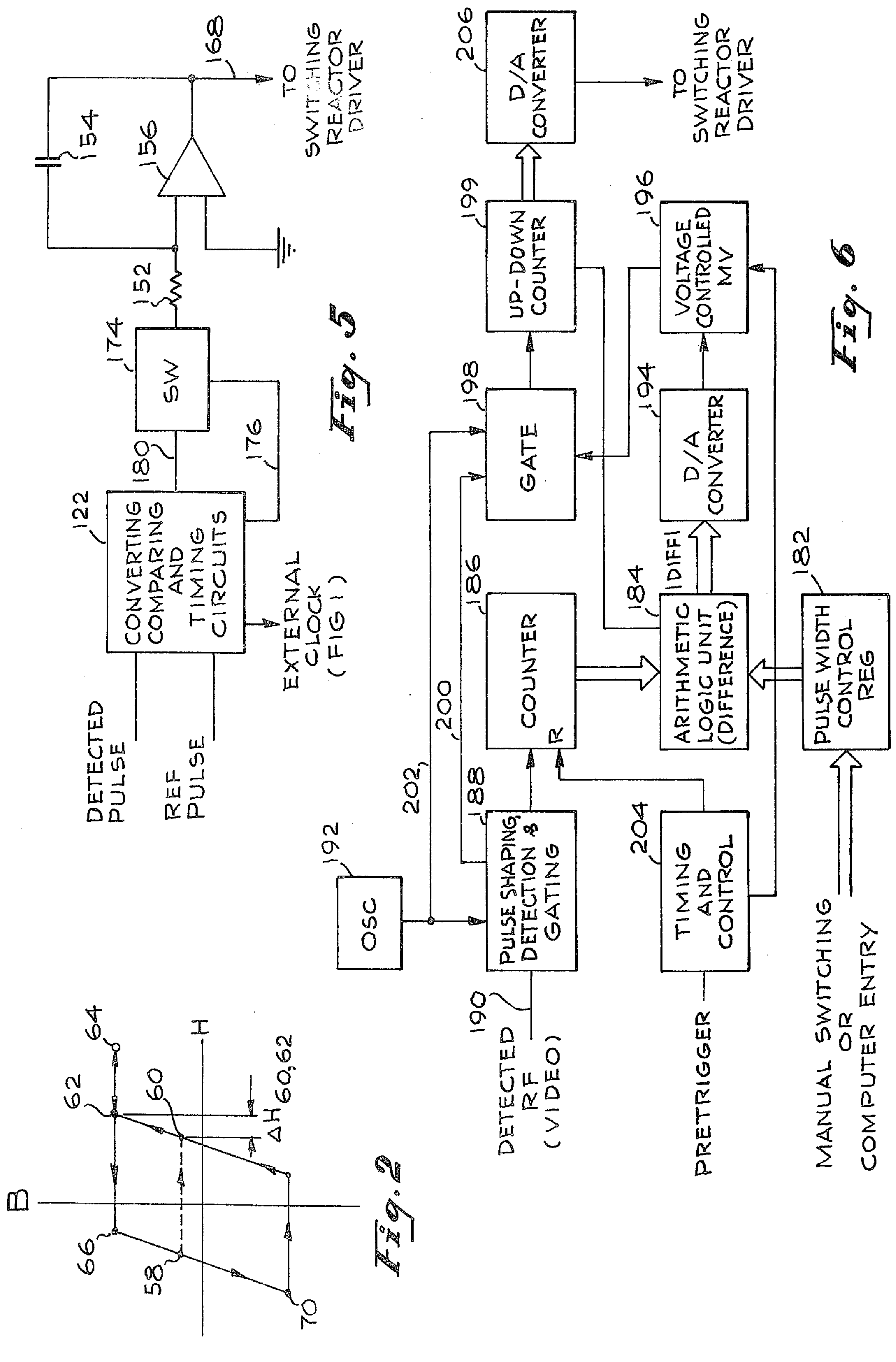
FIG. 2 is a diagram showing certain magnetic characteristics of a saturable core reactor as used in the arrangement according to FIG. 1.
FIG. 5 is a block diagram representing a simplified version of the control circuit of FIG. 4.
FIG. 6 is a combination block and schematic diagram showing an arrangement in accordance with the invention for achieving automatic pulse width control in response to digital information.

To better understand how variable pulse widths are achieved, it is desirable to refer to the B-H loop characteristic of the switching reactor 48 as set forth in FIG. 2. In that figure, if the initial conditions are such that the magnitude of the reset current through filter choke 54 and the reset winding 56 of switching reactor 48 is sufficient to drive the switching reactor 48 to the point 58 on the B-H loop, then when a voltage pulse is developed across reactor 48 as a result of the discharge of pulse-forming network 36, the path followed on the B-H loop during the switching process will be from point 58 to point 60, thence to point 62 and, finally, to point 64. The time required to drive switching reactor 48 into saturation is the time it takes for the path from point 60 to point 62 to be traversed, which corresponds to the time that it takes for the magnetic field intensity to increase by $\Delta H_{60,62}$. The recovery time for the switching reactor 48 is represented by the time that it takes to move along the path from point 64, through points 62 and 66, to the reset point 58. The time required to traverse this path is determined by the magnitude of the energy stored in filter choke 54 and the available volt-seconds supplied by the pulse width control stage 68 (FIG. 1). Consequently, if the reset current supplied by pulse width control stage 68 is such that the operating point on the B-H loop is point 62, then the pulse supplied to magnetron 46 has zero width. If the reset current supplied by pulse width control 68 is such that switching reactor 48 is operating at point 70 on the B-H loop, then the width of the pulse provided to magnetron 46 is at its maximum value, since the time required to achieve the saturated state in the core of reactor 48 is maximum. For intermediate pulse widths it is only necessary to make adjustments in control stage 68 and thus move the operating point along the path between points 66 and 70 of the B-H loop. It should be noted that in order to achieve the maximum range of pulse widths, the maximum time to saturate the core of switching reactor 48 should be equal to or greater than twice the single-path delay time of pulse forming network 36.

Figure 3:
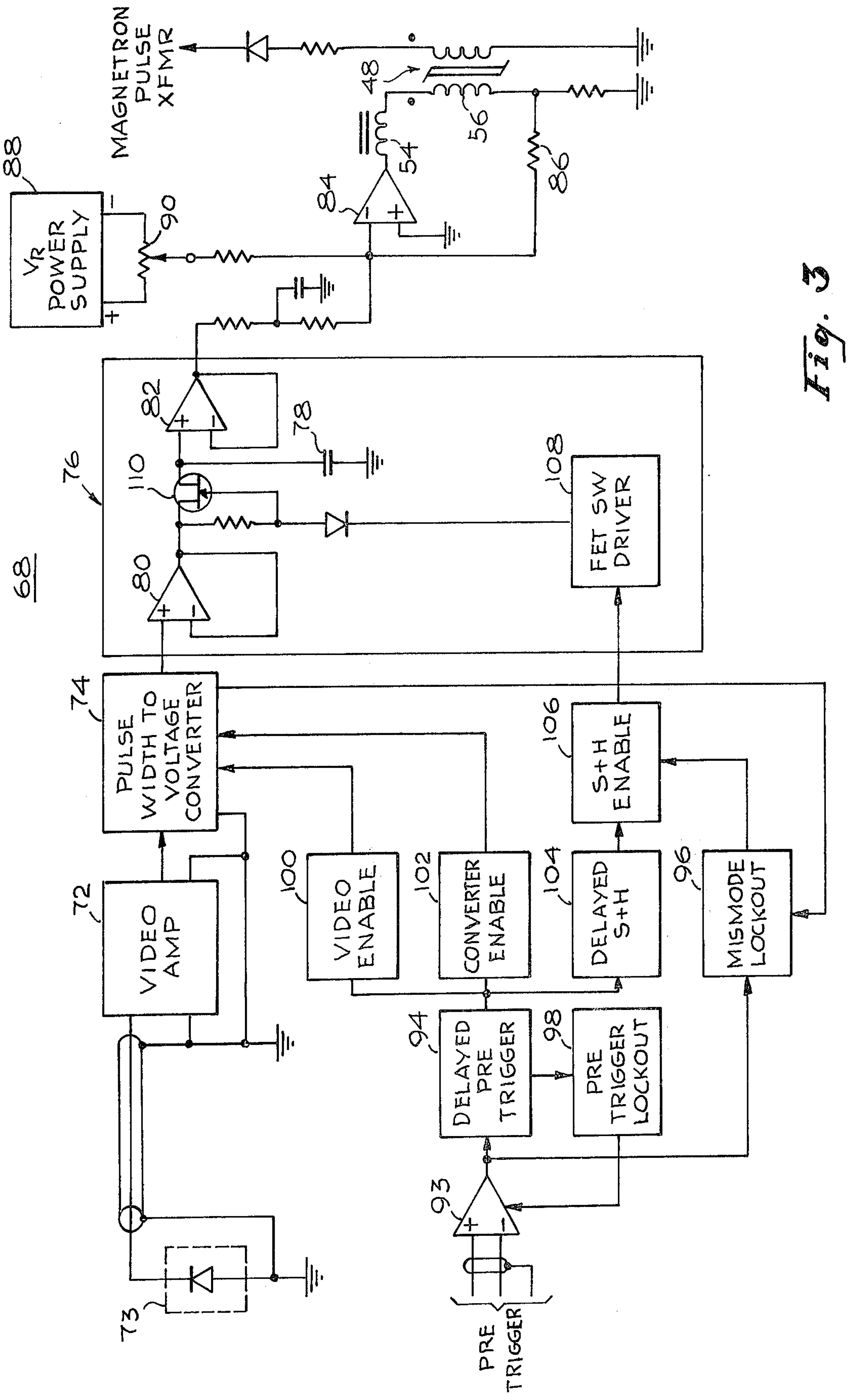
FIG. 3 is a combination block and schematic diagram showing further details of the arrangement of FIG. 1.

Details of the pulse width control stage 68 of FIG. 1 are set forth in FIG. 3 in which pulse width control stage 68 is shown comprising video amplifier 72, which may be a balanced bridge inverting operational amplifier and which receives video signals from detector 73 corresponding to rectified output pulses from magnetron 46 (FIG. 1), and pulse width to voltage converter 74, which includes a pulsed charged pump and storage capacitor, not shown. Such circuits for converting pulse width to voltage amplitude are well-known and need not be described here. It will be noted (FIG. 1) that the detector 73 is shown coupled to the magnetron 46.

This coupling may be such as to pick off energy from the magnetron output applied to the RF load 47 or, if desired, it may be arranged to detect the input pulse to the magnetron, as by capacitive coupling to the magnetron anode. The coupling point selected determines whether the system monitors pulse width of the magnetron output or the drive to the magnetron. Pulse width to voltage converter 74 is coupled to a sample and hold circuit 76 which includes a switched storage capacitor 78 with pre-and post-buffer amplifiers 80 and 82, respectively.

The sample and hold circuits are coupled to a switching reactor driver 84 which has a current feedback by way of resistor 86 and receives an input reference voltage from power supply 88 of a magnitude determined by a pulse width control element 90 in the form of a potentiometer. Switching reactor 48 is also shown in FIG. 3.

There are also shown in FIG. 3 timing and control circuits to assure proper sequencing of the events which occur in the pulse width control system 68. These will be described together with the operation of the pulse width control system 68. A pretrigger signal from the sync generator 12 of FIG. 1 is received in line receiver 93. The pretrigger signal causes the line receiver to go from a (1) to a (0) state which triggers delayed pretrigger circuit 94 and sets the mismode lockout flip-flop 96. This mismode lockout circuit 96 will remain in the set state indefinitely unless it is reset by a reprocessed video pulse generated by the pulse width to voltage converter 74.

When circuit 94 is triggered, it in turn triggers pretrigger lockout circuit 98 which in turn drives line receiver 93 back to its original (1) state and holds it in the off condition for a period of time equal to the minimum intersync pulse interval. After a predetermined length of time, delayed pretrigger one shot multivibrator (OSM) 94 returns to its (0) state, thereby triggering the video enabling circuit 100, converter enabling circuit 102 and delayed sample and hold circuit 104. When video enabling circuit 100 is triggered by delayed pretrigger circuit 94, it provides an enabling signal to converter 74 to permit converter 74 to process a video pulse which falls within a period of time in which a non-spuriouos video pulse would occur.

When converter enabling circuit 102 changes its state as a result of an impulse from delayed pretrigger circuit 94, it removes the clamp across the pulse width to voltage converter charge storage capacitor, not shown, and allows that capacitor to charge to a voltage proportional to the video pulse width. After a predetermined time, delayed sample and hold circuit 104 changes state and triggers sample and hold circuit 106 if the mismode lockout circuit 96 has been reset by a non-spurious reprocessed video pulse generated by the pulse width to voltage converter 74. When sample and hold enabling circuit 106 changes state as a result of a pulse from delayed sample and hold circuit 104, it turns on field effect transistor switch driver 108 and, consequently, field effect transistor 110, thus allowing the sample and hold preamplifier 80 to drive the voltage of sample and hold capacitor 78 to a level equal to that at the output of the pulse width to voltage converter 74.

Switching reactor driver 84 is an inverting operational amplifier with current feedback, as has been indicated. Its function is to sum the output of the sample and hold circuit 76 and the pulse width adjusting voltage from pulse width control element 90 and to convert this in a linear manner to a control current to regulate the switching reactor 48. Such operational amplifiers are well known in the art and need not be further described here.

In general, the function of the timing and control circuits 94 through 106 is to assure that random noise, spurious moding and unrelated RF pulses do not produce false control information in the pulse width to voltage converter 74, thus assuring that the adjustment of pulse width by the automatic action of the circuit according to this invention will accurately represent the pulse width which has been chosen by the adjustment of pulse width control element 90.

When the magnitude of the current from the driver 84 resulting from the summing operation as described exceeds that which would be expected for a pulse of the desired width, the operating point 58 on the B-H loop (FIG. 2) will be moved upwardly toward the point 66 and the time required to switch reactor 48 into the saturated state will be reduced, thus reducing the width of the next succeeding pulse provided to magnetron 46. Conversely, if the length of the RF pulse out of magnetron 46 is less than the desired width, the voltage from pulse width to voltage converter 74 will be reduced, causing an ultimate reduction in the current flowing through winding 56 of switching reactor 48. The operating point of that reactor will fall to a point between point 58 and point 70 on the B-H loop of FIG. 2, resulting in a longer time for the core of switching reactor 48 to be saturated, thus widening the pulse supplied to magnetron 46. In this fashion the RF pulse generated by magnetron 46 is controlled until its output pulse reaches the desired width, as set by pulse width control element 90.

Figure 4:
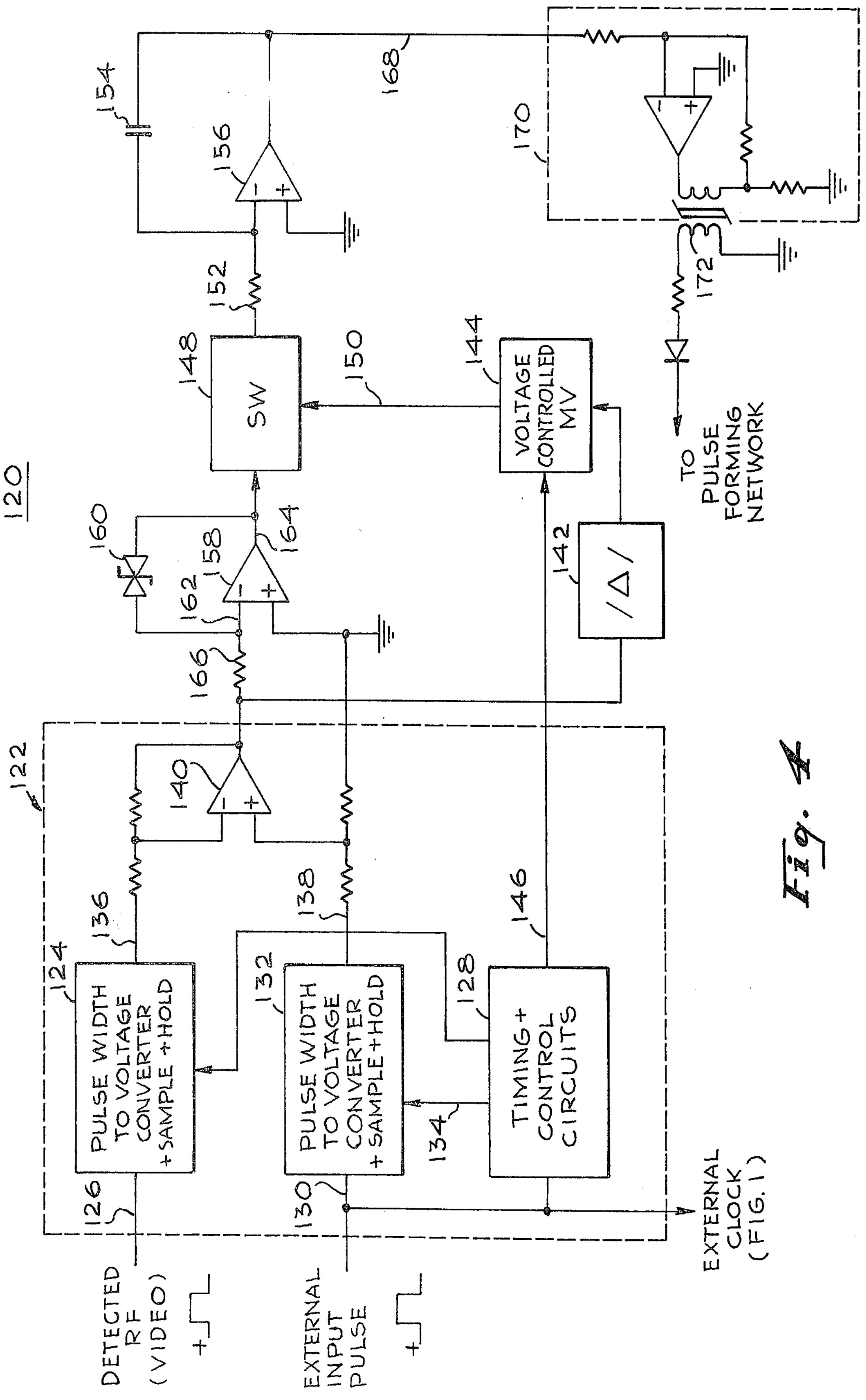
FIG. 4 is a combination block and schematic diagram showing a pulse width control system in accordance with the invention utilizing a predetermined input pulse as the control reference.

FIG. 4 depicts schematically a variation of the pulse width control system and shows system 120 including converting, comparing and timing circuit section 122 together with associated output circuitry. A video signal corresponding to the RF signal generated by the signal generator 46 of FIG. 1 is coupled to pulse width to voltage converter and sample and hold circuits 124 via input terminal 126. Timing signals which have been discussed more fully in connection with FIG. 3 are derived from timing and control circuits 128 and fed to circuits 124. A reference pulse, the width of which represents the desired width for the video pulse, is introduced via conductor 130 to a second pulse width to voltage converter and sample and hold circuit combination 132, to which timing and control signals are also introduced via conductor 134 from the timing and control circuits 128. The fashion in which pulse width to voltage converters are utilized in the systems according to this invention has already been described in connection with FIGS. 1 and 3. In like fashion, output voltages representing the widths of the video pulse introduced at conductor 126 and the reference pulse introduced at conductor 130 are derived at conductors 136 and 138 and applied to amplifier 140 which produces a signal indicating whether the video pulse width is less than or greater than the input pulse width and determines the magnitude and sign of the difference. The absolute value of the magnitude of the difference between the video and reference pulses is indicated by teh output signal from the stage 142 which controls the pulse width of a voltage controlled one-shot multivibrator 144 to which appropriate timing and control information is fed from the circuits 128 via conductor 146. Multivibrator 144 then gates switch 148 into an "on" condition by providing a signal via conductor 150. Switch 148 passes a sign-sensitive clamped voltage to an integrator circuit including resistor 152, capacitor 154 and amplifier 156. The sign-sensitive clamped voltage is derived by means of amplifier 158 which has a Zener diode 160 coupled between its input terminal 162 and its output terminal 164, which is connected to the switch 148. Amplifier 158 receives its input signal from amplifier 140 through resistor 166. The integrated signal from the cited combination of resistor 152, capacitor 154 and amplifier 156 is fed through conductor 168 to switching reactor driver 170 which drives switching reactor 172 and its associated circuits in the fashion which has been described in connection with FIGS. 1 and 3. The error correction rate achieved by the circuit of FIG. 4 shows an exponential characteristic increasing with the magnitude of the error.

The circuit of FIG. 5 is a simplified version of the circuit of FIG. 4; for example, it does not include the generator and voltage controlled one-shot multivibrator 144 nor the clamped, sign-sensitive voltage fed into switch 148 of FIG. 4. Switch 174 of FIG. 5 merely receives timing signals via conductor 176 and a signal via conductor 180 representing the difference between the voltage converted video pulses and the reference pulse. The output signal from switch 174 is integrated in the same fashion as was described in connection with FIG. 4 and fed to the switching reactor driver and switching reactor as in FIG. 4. For large errors in the video pulse width, the number of pulses which may be transmitted before total correction is achieved may be greater with the circuit of FIG. 5 than it would be with the circuit of FIG. 4.

In FIG. 6, representing another variation of pulse width control system, the desired pulse width is indicated by the information, in digital form, introduced into pulse width control register 182, either by manual switching of a pulse width control element or by means of data provided by a computer central processing unit. The output control signal from register 182 is fed to an arithmethic logic unit 184 to which is also fed the output signal from a counter 186. The input information for counter 186 is received from pulse shaping, detection and gating circuit 188 into which the detected RF pulse, or a signal representative thereof, is fed through input connector 190. There is also fed to circuits 188 the output of an oscillator 192. The detected RF pulse or video information at conductor 190 drives a threshold detection circuit in gating circuit 188 to gate the output of oscillator 192 to the counter 186. The digital output of the counter is arithmetically compared in the logic unit 184 to the contents of the pulse width control register 182, as indicated. A magnitude of the difference signal is converted in digital-to-analog converter 194 to a voltage representative of the difference. That voltage controls the pulse duration of one-shot multivibrator 196, the output of which is fed to gate 198 as are certain other signals which will be described. Arithmetic logic unit 184 supplies a digital signal indicative of sign to the up-down counter 199.

The circuits 188 contain provision for protecting against misfiring of the RF source. If the video signal at conductor 190 lies within an acceptable range as determined by threshold circuitry in the stage 188, i.e. the signal is a valid pulse, the gating circuits of stage 188 provide an enabling signal on conductor 200 which is fed to gate 198. The output of oscillator 192 is applied via conductor 202 to gate 198 along with the other signals which have been described. When the multivibrator 196 is triggered "on" by a signal from the timing and control circuits 204 and if the enabling signal exists on conductor 200, the output signal from oscillator 192 through gate 198 to drive the up-down counter 199. The output of counter 199 is converted to a representative voltage by digital-to-analog converter 206 which drives the switching reactor driver and its associated switching reactor in the fashion which has been described in connection with FIGS. 1 and 4. Appropriate reset signals are provided to counter 186 by timing and control circuits 204. Up-down counter 199 serves as an integrator and the error correction rate is a function of the magnitude of the error in the video pulse width. Of course, in this case, the video pulse width has been quantized in time and the residual error will be an integral value of plus or minus the inverse value of the frequency of oscillator 192.

Although there have been described hereinabove specific circuits for pulse width control systems in accordance with the invention for the purpose of illustrating the manner in which the invention may be used to advantage, it will be appreciated that the invention is not limited thereto. Accordingly, any and all modification, variations or equivalent arrangements which may occur to those skilled in the art should be considered to be within the scope of the invention.

What is claimed is:

1. A pulse width control system including:

means for generating a pulse of a first width, said generating means having output means adapted for coupling to a load;

means for deriving pulses corresponding to the pulses supplied to said load;

converting means for converting the widths of pulses from said deriving means to voltages representative of such widths;

pulse with reference means; and automatic means coupled to said output means and responsive to a combination of the voltages from said reference and converting means, respectively, to determine what portion of the width of said pulse of a first width is coupled from said output means to said load.

2. Apparatus according to claim 1 in which said automatic means includes a reactor having a saturable core and first and second windings, said first winding being coupled to said converting means and to said reference means and being responsive to a combination of the voltages from said reference means and said converting means, respectively, to control the reset operating point on the B-H loop of said saturable core, said second winding being coupled to said pulse generating means and to said output means and being responsive to said pulse of a first width from said generating means to cause saturation of said core at a time following the initiation of said pulse of a first width determined by said reset operating point.

3. Apparatus according to claim 2 in which said means for generating a pulse of a first width is coupled to said load along a path and said second winding of said reactor is coupled in shunting relationship to said path.

4. Apparatus according to claim 2 in which said means for generating a pulse of a first width is coupled to said load along a path and said second winding of said reactor is coupled across said path in a circuit including means capable of diverting from said load a portion of said pulse of a first width.

5. Apparatus according to claim 1 in which said load is a generator of RF signals and said means for deriving pulses includes an RF detector.

6. Apparatus according to claim 5 in which said RF signal generator is a magnetron.

7. Apparatus according to claim 1 in which said reference means includes a conductor carrying a pulse have a reference width.

8. Apparatus according to claim 1 in which said reference means includes means for generating digital signals.

9. Apparatus according to claim 1 in which said converting means includes means for quantizing the pulses from the deriving means.

10. Apparatus according to claim 9 in which said pulse quantizing means includes an oscillator.

11. Apparatus according to claim 2 in which said pulse width reference means is a source of pulse width control voltage of continuously variable magnitude.

12. Apparatus according to claim 3 further including an energy dissipating sink coupled in series with said secondary winding in said shunting circuit.

13. Apparatus according to claim 12 in which said sind is resistive in character and the magnitude of its resistance corresponds to the characteristic impedance of said load.

14. Apparatus according to claim 2 in which said means for generating a pulse of a first width includes an energy storage capacitor coupled through a saturable core transformer to a pulse forming network and a control element for controlling discharge of said storage capacitor through one winding of said saturable core transformer.

15. Apparatus according to claim 14 in which the time required for reaching saturation of the core of said saturable reactor at the minimum reset operating point on the B-H loop of said saturable core is equal to at least twice the one-way delay time of said pulse forming network.

16. Apparatus according to claim 11 which includes, in addition, combining means coupled to said converting means and to said source of control voltage for producing a combination of the voltages from said reference means and said converting means to control the reset operating point on the B-H loop of said saturable core.

17. Apparatus according to claim 16 in which said combining means comprises an inverting operational amplifier with current feedback.

18. A system for controlling the width of pulses from a pulse generator comprising, in combination:

a pulse generator having the capability of generating pulses of controllable width;

drive means coupled to trigger the pulse generator;

predeterminable pulse width control means coupled to provide a signal to the drive means to control the triggering of the pulse generator; and a pulse width detector coupled between an output of the pulse generator and an input of the control means; the control means including means for comparing the output of the pulse width detector with a predetermined condition of the control means and controlling the signal to the drive means in accordance with the result of said comparison.

19. A system in accordance with claim 18 wherein the drive means comprises a device having a variable operating point and a response corresponding to the position of said operating point within the operating range of the device, said operating point being variable in accordance with the signal from the control means.

20. A system in accordance with claim 19 wherein said device comprises a saturable reactor having an operating point variable over the B-H characteristic curve in response to the signal applied from the control means.

21. A system in accordance with claim 20 further including circuitry coupled to the control means and the drive means such as to drive the saturable reactor into saturation and thereby terminate the output signal therefrom at a time coincident with the termination of the signal to the drive means.

22. A system in accordance with claim 21 further including a pulse forming network coupled to drive said saturable reactor from a preset operating point to a saturated condition.

* * * * *